Dec. 15, 1959 C. W. TEPPER 2,917,678

METHOD OF MOUNTING SUB-MINIATURE TUBES IN WIRING PLATES FOR ELECTRONIC ASSEMBLIES

Filed Sept. 20, 1956 2 Sheets-Sheet 1

INVENTOR
C. W. TEPPER

BY [signature] [signature]
ATTORNEYS

INVENTOR
C. W. TEPPER

BY

ATTORNEYS 2,917,678

METHOD OF MOUNTING SUB-MINIATURE TUBES IN WIRING PLATES FOR ELECTRONIC ASSEMBLIES

Charles W. Tepper, Rochester, N.Y., assignor, by mesne assignments, to the United States of America as represented by the Secretary of the Navy Application September 20, 1956, Serial No. 611,085

7 Claims. (Cl. 317—101)

The present invention relates to the assembly of miniature tubes to printed circuits. In the assembly of printed circuits, it is necessary that the leads of miniature tubes be secured to the printed circuitry formed on the chassis of the printed circuit assembly.

Heretofore, various tube sockets have been devised for use in securing leads of subminiature tubes. Typical of such is an electrical socket for miniature tubes including basically a spring-like contact having two or more resilient arms wherein the lead or prong of the tube is forced between the resilient arms, making contact through but a small portion of the entire length of the resilient arms.

It has been found that in the utilization of a socket of the aforesaid type, considerable difficulty is encountered in the insertion of the extremely fine soft wire leads which usually have a diameter of from .015 to .019 inch. Moreover, it has been found that the wire leads, due to their flexibility, do not readily lend themselves for insertion into conventional sockets such as heretofore described. It has also been discovered that such a socket due to its form of construction provides only low mechanical retention and small electrical contact between the lead wires and the socket. It has also been found that considerable flaking of the contacts occurs during insertion and withdrawal of the leads, which has proven to have a deleterious effect.

The present invention provides a new and improved method and apparatus of preparing and permanently mounting subminiature tubes in a printed circuit and which overcomes all the disadvantages heretofore encountered in prior art methods and devices.

An object of the present invention is the provision of a new and improved method of preparing and permanently mounting subminiature tubes in a printed circuit.

Another object of the invention is to provide an arrangement whereby subminiature tubes are supported on and connected in a printed circuit without utilizing separately fabricated tube sockets.

Still another object of the invention is to provide a method and means for preparing and supporting miniature tubes in a simplified manner, and also insuring good electrical connection between the tubes and associated printed circuit.

A still further object of the invention is the provision of supporting structure integrally formed with a printed circuitry and adapted to receive the preformed tube leads whereby the tube may be permanently secured in the circuitry.

Other objects and many of the attendant advantages of this invention will be readily appreciated as the same becomes better understood by reference to the following detailed description when considered in connection with the accompanying drawings wherein.

Figure 1:
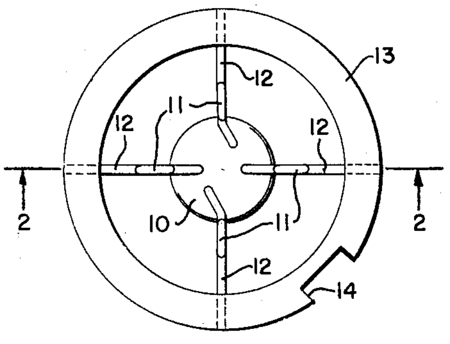
Fig. 1 is a top plan view of a subminiature tube illustrating the supporting means for the preformed flexible leads thereof.
Figure 2:
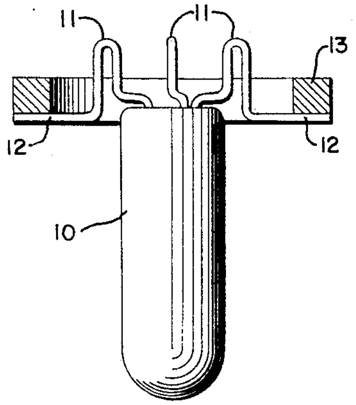
Fig. 2 is a sectional view taken on the line 2—2 of Fig. 1.

In accordance with the present invention the tube 10 is first prepared, as more clearly shown in Fig. 2, at or near the end of the tube manufacturing line by forming a substantially U-shaped, open loop shaped, or more particularly, an inverted U-shape element 11 on each of the conventional leads carried by the tube, each element terminating in a straight portion 12 at a right angle with respect to the looped or U-shaped element 11. The aforesaid elements 12 are hot pressed into a thermoplastic ring 13, the ring being provided with a keyway 14, as more clearly shown in Fig. 1. The aforesaid operations prepare the tube for subsequent mechanical assembly and also prevent entanglement of the leads, reduce the possibility of wire or glass damage at the seal and since the position of the wires or leads is controlled it facilitates electrical testing or aging operations between the end of the manufacturing line and the assembly operation.

Figure 3:
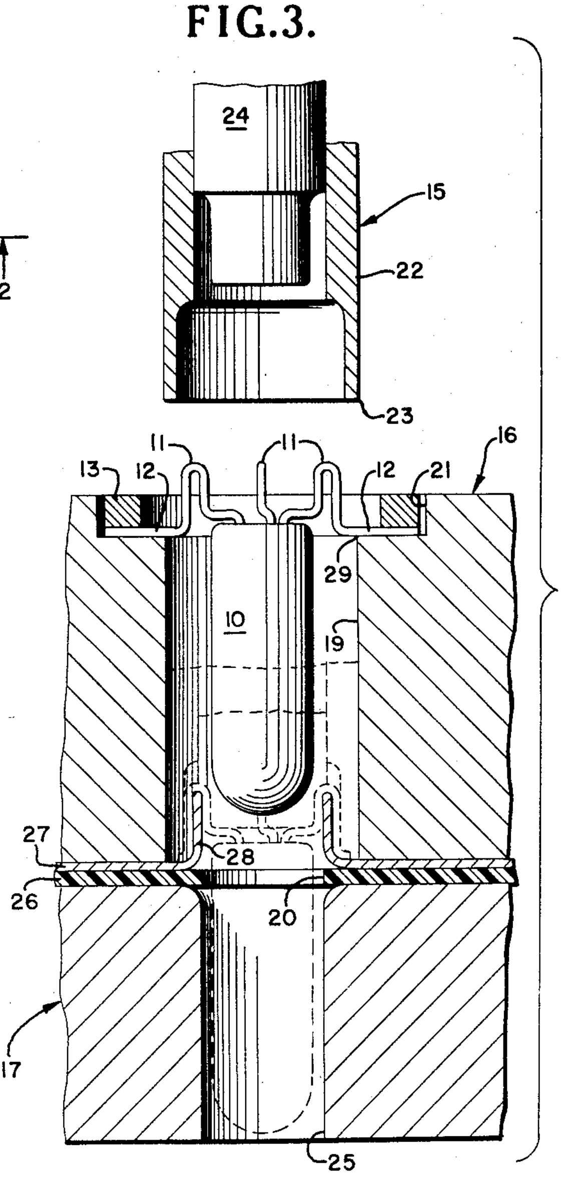
Fig. 3 is a view illustrating the steps and structural means employed for mounting the tube on a wiring plate assembly.
Figure 4:
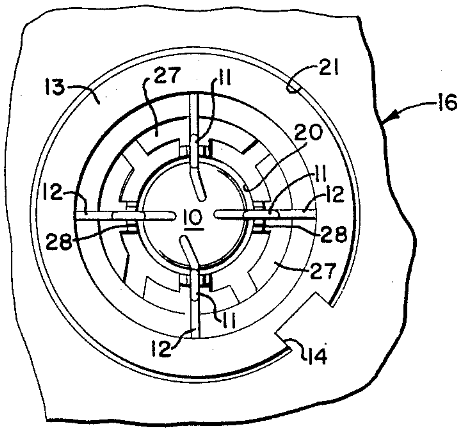
Fig. 4 is a plan view of the die block of Fig. 3, illustrating the tube arrangement of Fig. 2, supported thereon.
Figure 5:
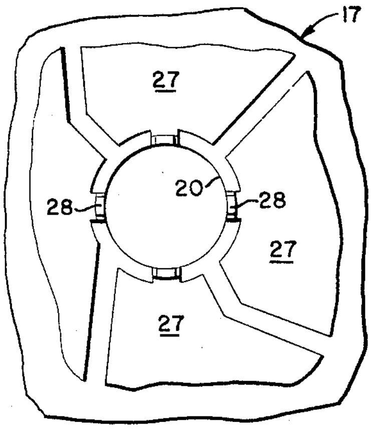
Fig. 5 is a plan view of the nest block and wiring plate assembly of Fig. 3.
Figure 7:
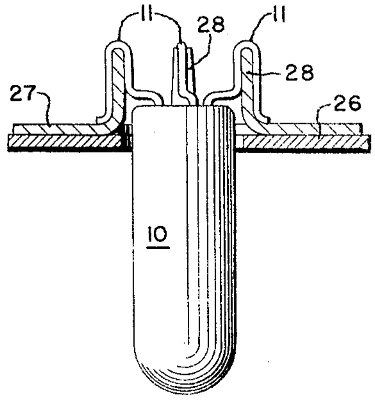
Fig. 7 is a sectional view taken on the line 7—7 of Fig. 6.
Figure 6:
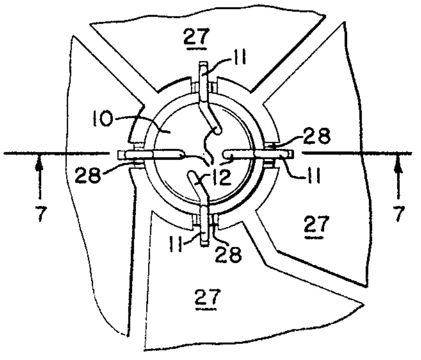
Fig. 6 is a plan view illustrating the manner in which the tube is finally connected in a printed circuit.

Referring now to Fig. 3, the basic apparatus for mechanically mounting the prepared tube of Figs. 1 and 2 on a wiring plate assembly is illustrated and comprises a punch assembly 15, a die block 16, and a nest block 17. The die block is provided with a bore 19 extending therethrough and terminating in a recess 21, of a larger diameter than the bore, for receiving the plastic ring 13 whereupon the tube is supported within bore 19. It will be noted, Fig. 3, that the punch assembly 15 is arranged above the die block 16 in alignment with bore 19 and comprises a tubular member 22 having a cutting edge 23 and a plunger or punch 24 which is adapted to be moved with or independently of the tubular member 22 as the case may be. The nest block 17 is provided with a bore 25 extending therethrough in alignment with bore 19 and punch assembly 15. Disposed on the nest block 17 is a wiring plate assembly including an insulating panel 26 and a tube circuitry having a plurality of metal strips or conducting elements 27 as more clearly shown on Fig. 5, the panel 26 having an opening 20 in alignment with the bore 25. The elements 27 are each provided with a preformed tab 28 bordering on opening 20 in panel 26, the aforesaid shaped element 11 being maintained in alignment with their respective tabs 28 by reason of the keyway 14 in member 13 and a complementary key formed on the die block 16, Fig. 4. It will be noted by the aforesaid arrangement that the wiring plate assembly is adapted to receive the tube disposed on the die block and arranged above the nest block 17. It will be noted, Fig. 3, that the wiring plate assembly which is adapted to receive the tube 10 is nested in the nest block. The nest block serves to support the wiring plate, locate the wiring plate such that the opening in the nest block is in alignment with the tube located above the wiring plate and so that the tabs on the wiring plate are oriented with respect to the tube wires whereupon the tube may be readily moved into position.

In operation, the prepared tube is nested in recess 21 in the die block 16, Fig. 3, and punch assembly 15 is moved downwardly as a unit. The cutting edge 23 on tubular member 22 and a complementary cutting edge 29 on the die block sever each of the straight portions 12 of the leads as the member 22 engages the portions 12 during the downward movement of the punch assembly whereupon the plastic ring is separated from the leads. Upon further movement of the punch assembly the tube is moved through bore 19 in the die block 16 and into bore 25 in nest block 17 until the remaining straight portion 12 of the leads are clamped between the outer surface of the wiring plate and the bottom surface of member 22 with the tabs 28 and loops 11 confined in tubular member 22 and the loops are in engagement with their respective tabs as shown in dashed outline, Fig. 3. Plunger 24 thereafter is moved with respect to member 22 and in response to such movement the loops 11 are clamped to the tabs 28 on the wiring plate by reason of the tubular member 22 and plunger 24. The punch assembly and die block are then removed in reverse sequence thereby releasing and exposing the tube and wiring plate assembly whereupon the wiring plate assembly is removed from the nest block and the loop elements are soldered to the tabs in any suitable manner such, for example, as by a dip or transfer solder operation.

From the foregoing, it will be apparent that the present invention provides a highly effective, inexpensive method and means for preparing and permanently securing a subminiature tube in a printed circuit in such a manner as to insure a good electrical connection between the tube and the associated printed circuit.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. The method of preparing and securing a plurality of fine leads of a subminiature tube to a plurality of corresponding conductive plates of a printed circuit comprising the steps of forming a loop portion and a straight portion on each of said leads, said straight portion being disposed at a right angle with respect to said loop portion, pressing each of said straight portions in a heated condition into a thermoplastic element, severing the straight portion of each lead substantially at the junction of the loop portions thereof thereby to separate the leads from said thermoplastic element, clamping said loop portions to said corresponding conductive plates, and thereafter soldering said loop portions to the plates thereby to permanently secure the tube to said plates and provide an efficient electrical connection between the loop portions and the plates throughout the length thereof.

2. The method of preparing and securing a plurality of fine leads of a miniature electronic tube to a plurality of corresponding wiring plates of a printed circuit comprising the steps of forming an open ended loop portion and a straight portion on each of said leads, said straight portion being disposed at a right angle with respect to said loop portions, preheating the leads and pressing the straight portions thereof into an annular ring composed of thermoplastic material, severing the straight portion of each lead substantially at the junction of the loop portion thereof thereby to separate the tube from said ring, pressing said loop portions into clamping engagement with said plates respectively, and thereafter soldering said loop portions to the wiring plates thereby to permanently secure the tube to said plates and provide an efficient electrical connection between said loop portions and the plates throughout the length thereof.

3. The method of preparing and securing a plurality of fine leads of a miniature electronic tube to a plurality of corresponding conductive plates of a printed circuit comprising the steps of forming an elongated open ended loop portion and a straight portion on each of said leads, said straight portions being disposed at a right angle with respect to said loop portions, preheating said leads, pressing the straight portion of each lead into an annular ring composed of thermoplastic material, simultaneously severing the straight portion of each of the leads substantially at the junction of said loop portion therewith thereby to separate said tube from the annular ring, pressing said loop portions into clamping engagement with corresponding preformed tabs on said conductive plates, and thereafter soldering said loop portions to the tabs thereby to permanently secure the tube to the tabs and to provide an efficient electrical connection between the loop portions and the tabs throughout the length thereof.

4. The method of preparing and securing a plurality of fine leads of a miniature electronic tube to a plurality of conductive plates of a printed circuit assembly comprising the steps of forming an elongated open ended loop portion and a staright portion on each of said leads, said straight portions being disposed at a right angle with respect to said loop portions, preheating said leads, pressing said straight portions of the preheated leads into an annular ring composed of thermoplastic, supporting said annular ring in a position to facilitate simultaneous severing of said leads, severing the straight portion of each of the leads substantially at the junction of said loop portion thereof thereby to separate the tube from the annular ring, moving said tube and causing said loop portions to engage corresponding preformed tabs on said conductive plates, confining said loop portions and the tabs and moving the loop portions in clamping engagement with the tabs and thereafter soldering said loop portions to the tabs thereby to permanently secure the tube to the tabs and to provide an efficient electrical connection between the loop portions and the tabs throughout the length thereof.

5. The method of preparing and permanently securing subminiature tubes having a plurality of radially disposed fine lead wires to the conductive plates of a printed circuit comprising the steps of forming a substantially open loop shaped portion and a straight portion on each of the leads of the tube, pressing the straight portion of each lead in a heated condition into an annular member composed of thermoplastic material, severing the straight portions substantially at the junction of said loop shaped portions therewith thereby to separate the tube from said annular member, pressing and clamping said loop shaped portions to corresponding tabs formed on said conductive plates, and thereafter soldering the loop shaped portions to said tabs thereby to provide an efficient electrical connection throughout the length of said loop portions and the tabs.

6. The method of preparing and securing a plurality of fine leads of a miniature electronic tube to a plurality of conductive plates of a printed circuit assembly comprising the steps of forming a U-shaped portion and a straight portion on each of the leads of said tube, said straight portions being disposed at a right angle with respect to said U-shaped portion, preheating said leads, pressing said straight portion of said leads while in a heated condition into an annular member composed of thermoplastic material, supporting said annular member on a die block in a position to facilitate severing of said leads, severing the straight portions of the leads substantially at the junction of the U-shaped portions therewith thereby to separate the tube from the annular member, arranging said circuit assembly on a nest block upon which said die block rests, moving said tube toward said nest block until said U-shaped portions engage corresponding preformed tabs on said conductive plates, confining said U-shaped portions and tabs in such a manner as to move said U-shaped portions into clamping engagement with said tabs, removing said die block from said nest block thereby exposing said tube, leads and circuit assembly, removing said circuit assembly from said nest block, and soldering said U-shaped portion of the leads to the corresponding tab on the conductive plates.

7. In an electron tube installation, a tube having lead wires, a panel composed of insulating material and having an aperture therethrough for reception of the tube, a plurality of individual conductive plates mounted on said panel about said aperture, a preformed tab on each of said plates arranged perpendicular thereto and adjacent to said aperture, a plurality of preformed loop portions formed in each of the lead wires of the tube for individual clamping engagement with each of said tabs, and means for securing the wires to said plates.

References Cited in the file of this patent

UNITED STATES PATENTS

| | | |
|---|---|---|
| 2,718,625 | Harrison | Sept. 20, 1955 |
| 2,830,279 | Warsher | Apr. 8, 1958 |